(12) United States Patent
Samid

(10) Patent No.: US 11,336,447 B2
(45) Date of Patent: May 17, 2022

(54) SPLIT SECURITY SOLUTIONS FOR VIDEO/AUDIO USING SPACEFLIP CLASS CIPHERS

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 17/510,324

(22) Filed: Oct. 25, 2021

(65) Prior Publication Data
US 2022/0045856 A1 Feb. 10, 2022

Related U.S. Application Data

(63) Continuation-in-part of application No. 17/216,274, filed on Mar. 29, 2021, now Pat. No. 11,159,317, and a continuation-in-part of application No. 17/001,163, filed on Aug. 24, 2020, now Pat. No. 10,965,460, which is a continuation of application No. 16/855,517, filed on Apr. 22, 2020, now Pat. No. 10,790,977.

(60) Provisional application No. 63/140,006, filed on Jan. 21, 2021.

(51) Int. Cl.
*H04L 9/14* (2006.01)
*H04L 9/08* (2006.01)
*H04L 9/00* (2022.01)
*H04L 9/06* (2006.01)

(52) U.S. Cl.
CPC ............... *H04L 9/14* (2013.01); *H04L 9/002* (2013.01); *H04L 9/0618* (2013.01); *H04L 9/085* (2013.01); *H04L 9/0858* (2013.01)

(58) Field of Classification Search
CPC ...................................................... H04L 9/14
See application file for complete search history.

(56) References Cited

U.S. PATENT DOCUMENTS

| | | | | |
|---|---|---|---|---|
| 6,507,911 B1 * | 1/2003 | Langford | ............ | G06F 21/6209 713/193 |
| 2010/0318786 A1 * | 12/2010 | Douceur | ............... | H04L 9/3247 713/155 |
| 2017/0034167 A1 * | 2/2017 | Figueira | ............... | H04L 63/0428 |
| 2020/0015082 A1 * | 1/2020 | Xie | ..................... | H04W 12/122 |

* cited by examiner

*Primary Examiner* — Bradley W Holder

(57) ABSTRACT

Audio files and Video files are processed with a new level of security by first spotting parts thereof with a strong entropic impact, and treating these sensitive parts (e.g. human faces, secret gadgets) with equivocation generating ciphers that would withstand quantum computer cryptanalysis.

6 Claims, 7 Drawing Sheets

Facial Data Separated from Photograph security-inconvenience optimization without entropic selection.

security-inconvenience optimization with entropic selection.

Split Level Determination

Raw Image:

Spotting P* areas

Dividing the Image to P* and P^ rectangles (2)

(1)

Pre Processing Image for P*/P^ Split

SPLIT SECURITY SOLUTIONS FOR VIDEO/AUDIO USING SPACEFLIP CLASS CIPHERS

SUMMARY

By allowing for a ciphertext to grow larger than the plaintext one can encrypt a message with any desired security, up to and included mathematical secrecy, and thereby offer resilience to quantum computing cryptanalysis (QC). This solution is impractical for large plaintexts, as the case is for audio and especially video streams. This situation begs for a solution as follows: for such large plaintexts one will identify parts of the plaintext with strong entropic impact, and split these parts to be encrypted via quantum-cryptanalysis resistant (QCR) ciphers (e.g. the here continued applications Ser. Nos. 16/855,517, 17/216,274, the SpaceFlip ciphers), while the rest of the plaintext is encrypted via quantum-cryptanalysis vulnerable (QCV) ciphers. The split should be carried out such that in the worst case scenario the plaintext will retain sufficient secrecy for its communicators to prevail in the underlying adversarial circumstances. This invention: "Split Security Solutions" ($S^3$) describes means for effective split of a plaintext, and outlines a protocol to execute the split while maintaining desired security, and also insuring operational convenience. Split-Security processed images will encrypt human faces to resist cryptanalysis, while the rest of the image may be vulnerable to quantum-cryptanalysis. The identities of the photographed people will remain private. Standard facial-recognition software will spot human faces in each video frame, and route these faces to be encrypted with quantum cryptanalysis resistant ciphers. Audio files will be transcribed, and rare words will be split for QCR processing. It will be the decision of the users how much inconvenience they agree to put up with in order to maintain a threshold level of security. This invention is also extended to multi-dimensional applications.

BRIEF EXPLANATION OF DRAWINGS

FIG. 1: Facial Data Separated from Photograph

This figure shows at the upper part a photograph featuring a few people. The middle section shows that the faces depicted on the picture have been identified by a facial recognition software. A respective rectangular shape was identified on the image for each face. These five faces are considered high-impact information. The faces identify the people in the photograph. If the faces are removed from the image then despite the fact that most of the image data is there and one can see the environment, the clothing, the hand gestures—the observer will be denied the information needed to identify the people in the photograph. By contrast, if a much larger area had been removed from the picture while leaving the faces in tact then the identity of the shown people would have been established. That is why we regard the face data as high impact data. This data is not removed but it slated to the high-security encryption, in particular to security that will be quantum cryptanalysis resilience (QCR), as opposed to the rest of the photograph that would be encrypted with nominal ciphers which are quantum cryptanalysis vulnerable (QCV). The lower part of the picture shows the picture with the facial data removed. The picture as shown at the bottom part represents all the picture information that would be encrypted at the lower QCV level, while the facial data is taken out for separate encryption at QCR levels.

Figure 1:
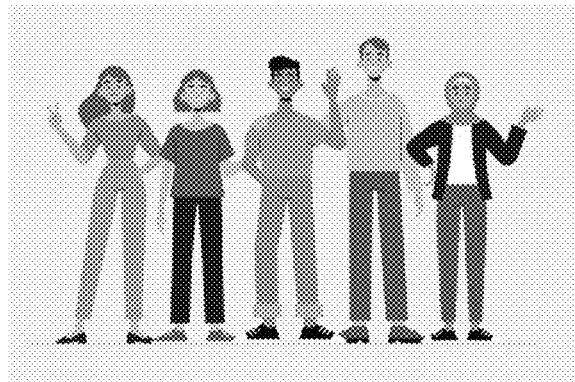
FIG. 1: Facial Data Separated from Photograph
Figure 1:
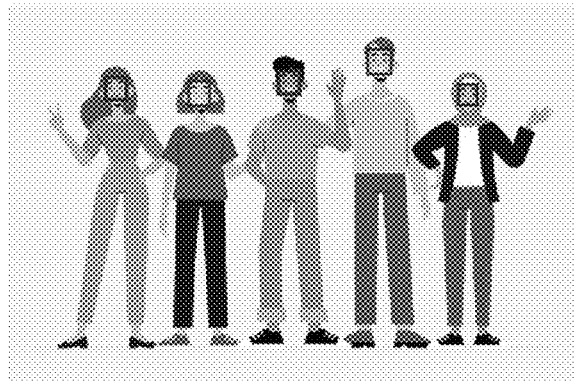
Figure 1:
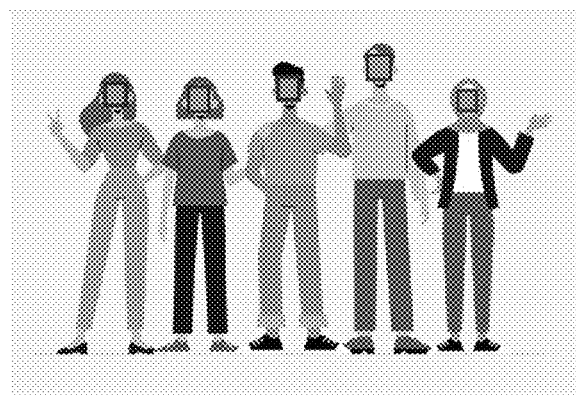
Figure 2:
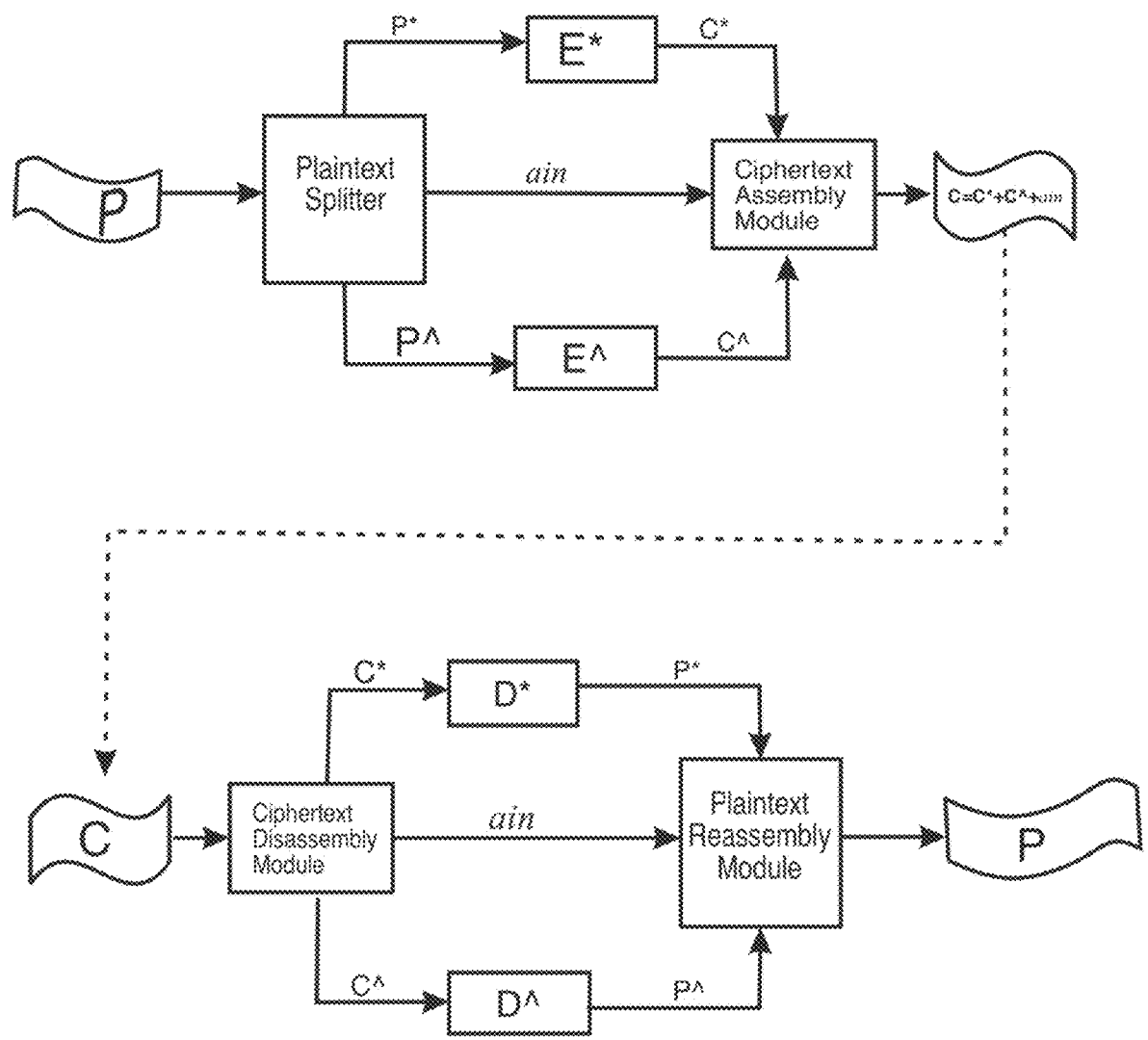

FIG. 2 Split Security Solutions Flowchart

This figure shows the overall flow chart of the $S^3$ operation. A plaintext P (left up side) is fed into a Plaintext Splitter. This module splits P to a high-entropy impact (high security impact) part, P*, and the rest: P^, so that P=P*+P^. The idea being that exposure of the P* part of the plaintext is much more harmful than exposure of the P^ part. The two splits, P* and P^ are routed each to their marching cipher. P* is routed to be processed by quantum cryptanalysis resistant (QCR) encryption, E* to generate the corresponding resilient ciphertext C*. P^ is routed to the nominal cipher E^ that generates the quantum cryptanalysis vulnerable (QCV) ciphertext: C^=E^(P^). The two ciphertexts are routed to a ciphertext assembly module. This module also accepts assembly instructions (ain) which guide the ciphertext assembly module to combine C* with C^ and add to it the assembly instructions, to aid the recipient in breaking apart C* from C^. The output from the ciphertext assembly module, C is then communicated to the recipient. The recipient would feed C into the ciphertext disassembly module in order to be guided by the assembly instructions as to how to split C into C* and C^. The ciphertext disassembly module then routes C* to the matching decryption module, where the decryption algorithm D* decrypts C* to P*. The ciphertext disassembly module also routes C^ to its matching decryption module D^, which extract P^ from C^. The two parts P* and P^ together with specially issued re-assembly instructions (ain) are routed to the Plaintext Reassembly module. This module then combines the two plaintext parts into the original P that started this flow: P*+P^→P.

Figure 3:
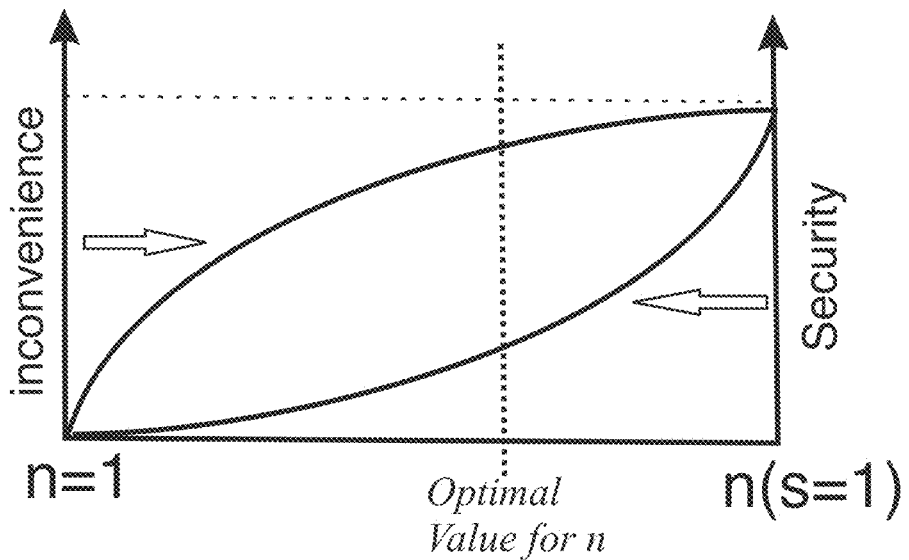

FIG. 3: Security-Inconvenience Optimization without Entropic Selection

This figure shows the balance between security and inconvenience on account of using equivocation generating ciphertext which are resilient against quantum computing. The x-axis shows the value of n, which is the number of plaintexts that would encrypt to a given ciphertext. The larger n the greater the security of the system, but since larger n imply either larger ciphertext, or larger keys, or both—this route spells inconvenience. Both security and inconvenience reach a benchmark high value for some reference value of n. Both security and inconvenience are formally calibrated as zero for n=1 (no equivocation. The user will choose an optima; value for n where the inconvenience is not too high and the security not too low. This selection of n value is the only degree of freedom available to the users of QCR v. QCV security. They can calibrate the level of QCR (quantum cryptanalytic resistant) encryption.

Figure 4:
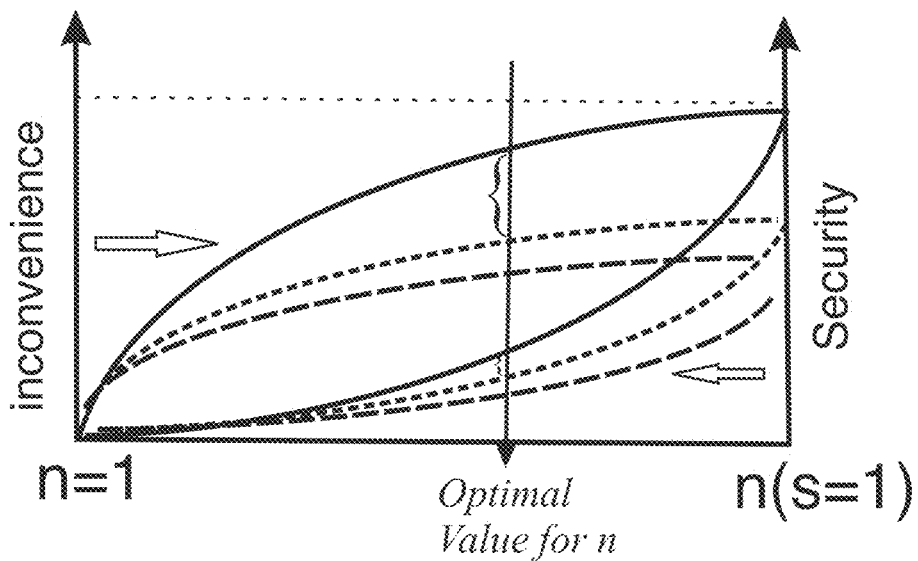

FIG. 4 Security-Inconvenience Optimization with Entropic Selection

In this figure the idea of split security solutions ($S^3$) is depicted. The users are not limited to selection of QCR selection level but add to it the split concept. Namely QCR level encryption will be limited to a portion P*∈P. The balance of P, namely P^ will be encrypted with nominal encryption which is quantum cryptanalytic vulnerable, QCV. By reducing the amount of plaintext that will undergo the burdensome QCR encryption one, one looses security levels but also alleviates the measure of operational inconvenience. This is another degree of freedom available to the users. The figure shows pairs of security and inconvenience lines (different styles of broken lines) that offer different balance between security and inconvenience. The figure shows with "{" sign the large drop of inconvenience relative to the no-split (unbroken line) option, corresponding to a smaller "{" showing the corresponding loss of security, which is small enough for the users to choose that particular equivocation level (n value) and the particular split of P to P* and P^.

Figure 5:
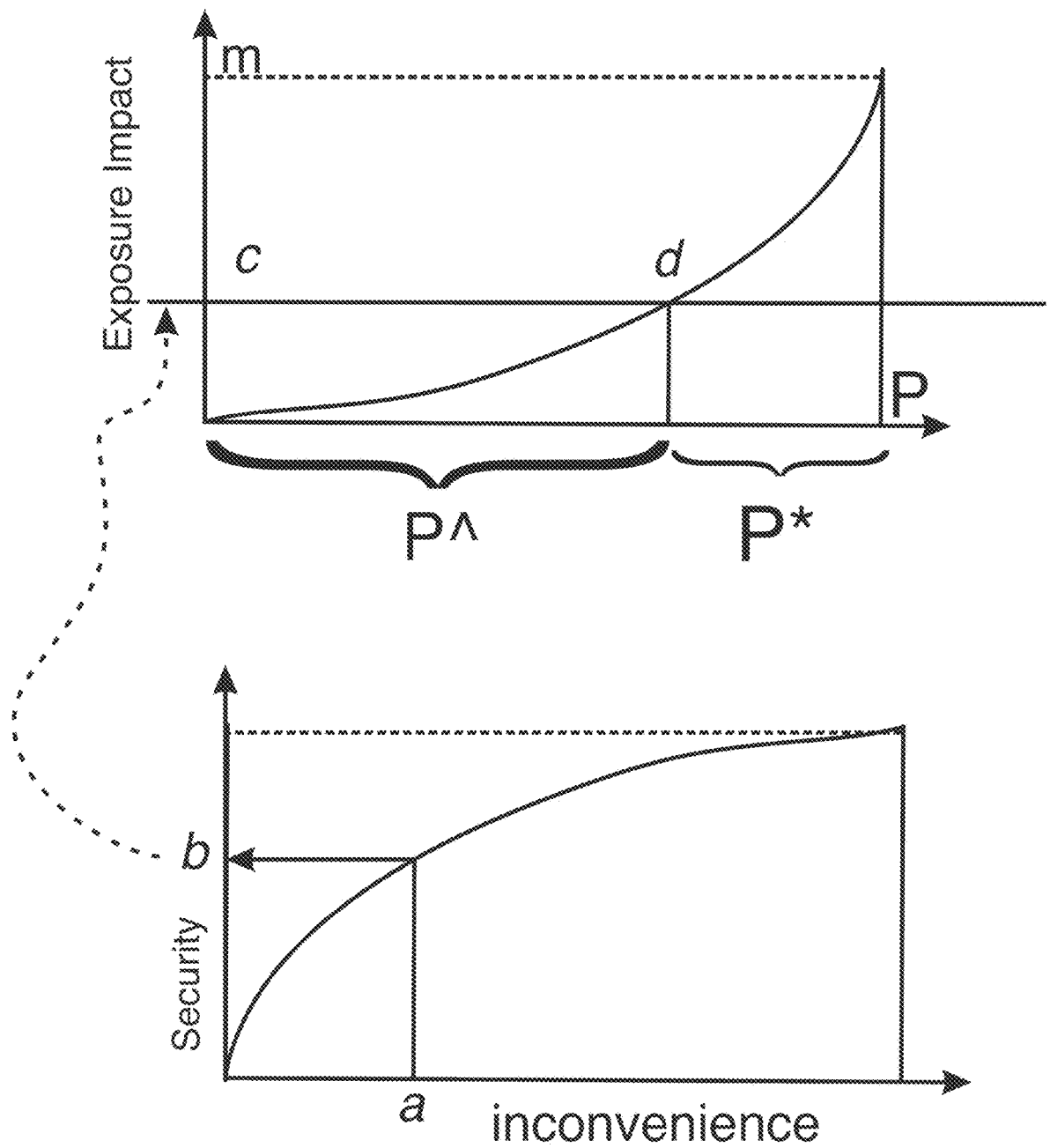

FIG. 5: Split Level Determination

This figure shows at the bottom a graph matching inconvenience with security. when one rises the other too. The figure shows point a which represents the level of inconvenience the users are willing to put up with. This a point corresponds through curve to point b of target security. This point b is then transferred to the upper graph where the plaintext P is depicted in a special way. Parts of P that carry a small entropic impact (not a big security damage if exposed) are to the left of the P line on that graph. While the parts of P which, if exposed, will cause a big damage, are marked to the right of the curve. The units of P that carry the entropic impact may be words, phrases, or whole sentences. The curve shows the degree of threat, or damage, or say entropic impact associated with exposure of P as depicted here when measured from the leftmost (start) point of the P line. Point c on the graph represent the security target determined by the graph below (b). By running an horizontal line at height c one intersects point d which when one draws a vertical line down from it to the P line, then one splits P to P* right the projection of point d on the P line and splits P^ left to the same point (the projection of point d on the P line). By encrypting P* with a QCR cipher, E* and the balance, P^ with a QCV cipher E^, one will achieve the exposure impact marked by line c which corresponds to the security level marked by by point b on the lower graph.

Figure 6:
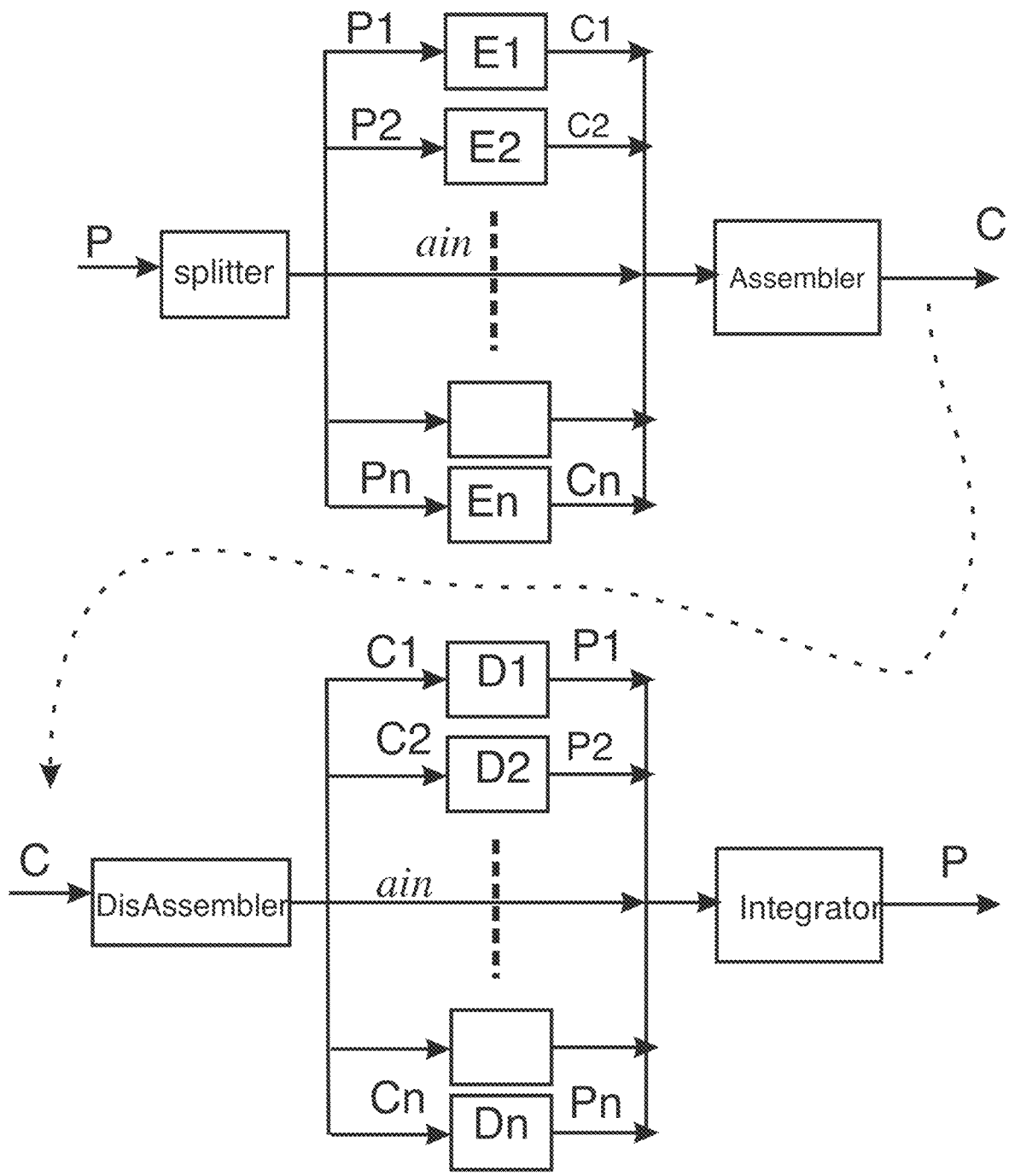

FIG. 6 Multi Split Security Solutions

This figure show the extent of the split security solution ($S^3$) to more than two option P* and P^, but rather to n options. The plaintext P as shown on the upper left side is fed into a plaintext splitter. The splitter will split P to n parts such that $P=P_1+P_2+ \ldots P_n$. Each split will be routed to a matching encryption algorithm $E_i$ for i=1, 2, ... n. The n ciphers represent different balance points between security and inconvenience. The generated ciphertext $C_i$ for i=1, 2, ... n are fed to a ciphertext assembler together with assembly instructions (μ, ain) to the Assembler module which combines all the n ciphertext file into an integrated ciphertext C.

The integrated ciphertext C is communicated to the recipient. The recipients feeds C to a Disassembler which splits C to the n $C_i$ for i=1, 2, ... n. The split ciphertext are all routed to their matching decrypting algorithm $D_i$, so that n plaintexts $P_i$ for i=1, 2, ... n are being generated and they are all routed to an integrator which is also fed by integration instructions (μ, ain) so that the integrator pieces together the n plaintext parts into the original P which started the procedure here described.

Figure 7:
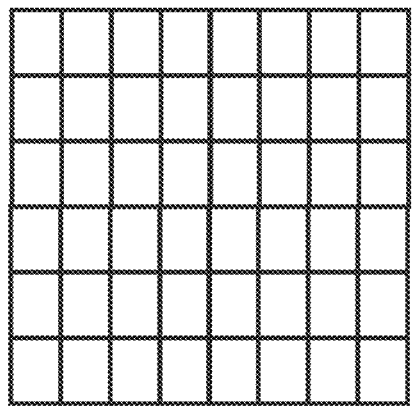
Figure 7:
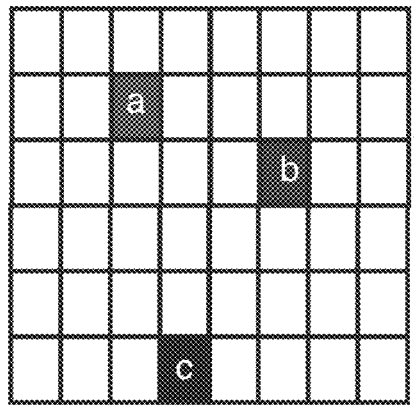
Figure 7:
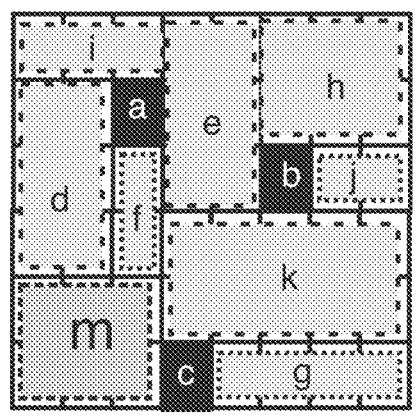
Figure 7:
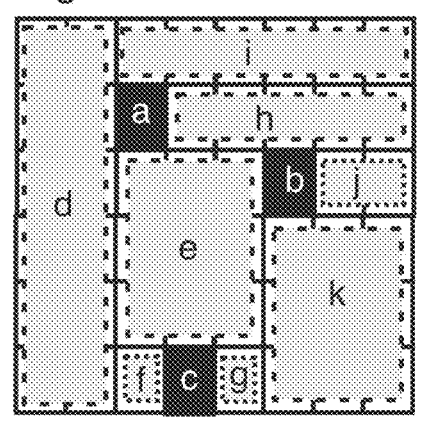

FIG. 7: Pre-Processing Image for P*/P^ Split

The figure shows a grid representing a raw image of 6×8, where the 48 units may be a single pixel or may be a group of pixels. In the middle of the figure this grid is shown with three grid spots a, b, and c marked with black, indicating areas that have been designated for QCR encryption (quantum cryptanalytic resistant). So instead of QCR encrypting the 48 image unit, say with a ciphertext of plaintext ratio of 10:1 only 3 image units will be so encrypted, and the other 45 units will be encrypted via a size preserving cipher. So instead of a ciphertext of size 45*10=450 units, we end up with 3*10+45=75 units, 75/480 smaller than without the split. &no The bottom part of the figure part (1) shows one version of cutting the 8*8 image to 10 rectangles, 3 of them represent QCR encrypted (a, b, c), and 7 of them are slated for QCV encryption (d, e, f, g, h, i, k).

To encrypt this image one will choose a random order for the 10 rectangles and compile a total ciphertext from the respective ciphertexts of the 10 rectangles. Say the order chosen is d, e, f, a, g, b, i, k, h, c. The respective ciphertext will be:
[complete ciphertext]=DDDD DDDD DDDD EEE EEE EEE F AAAAA AAAAA G BBBBB BBBBB III III JJ KKK KKK KKK HHHHH CCCCC CCCCC The instructions for the recipient how to disassemble C will be transmitted separately.

The encryption could also proceed according to the division of the image as shown on the left, identified as option (2). Here the image is divided to 11 rectangles, of different shapes and sizes. The order selected here may be d, e, f, g, h, i, j, k, m, a, b, c:
[complete ciphertext]=DDD DDD EEE EEE FF GGGG HHH HHH III JJ KKKKK KKKKK MMM MMM AAAAA AAAAA BBBBB BBBBB CCCCC CCCCC The letters in "complete cipher" reflect the rectangle from where they came.

The guide for interpreting the complete cipher will be different in both cases, but in each case the original image will be recovered.

Figure 8:
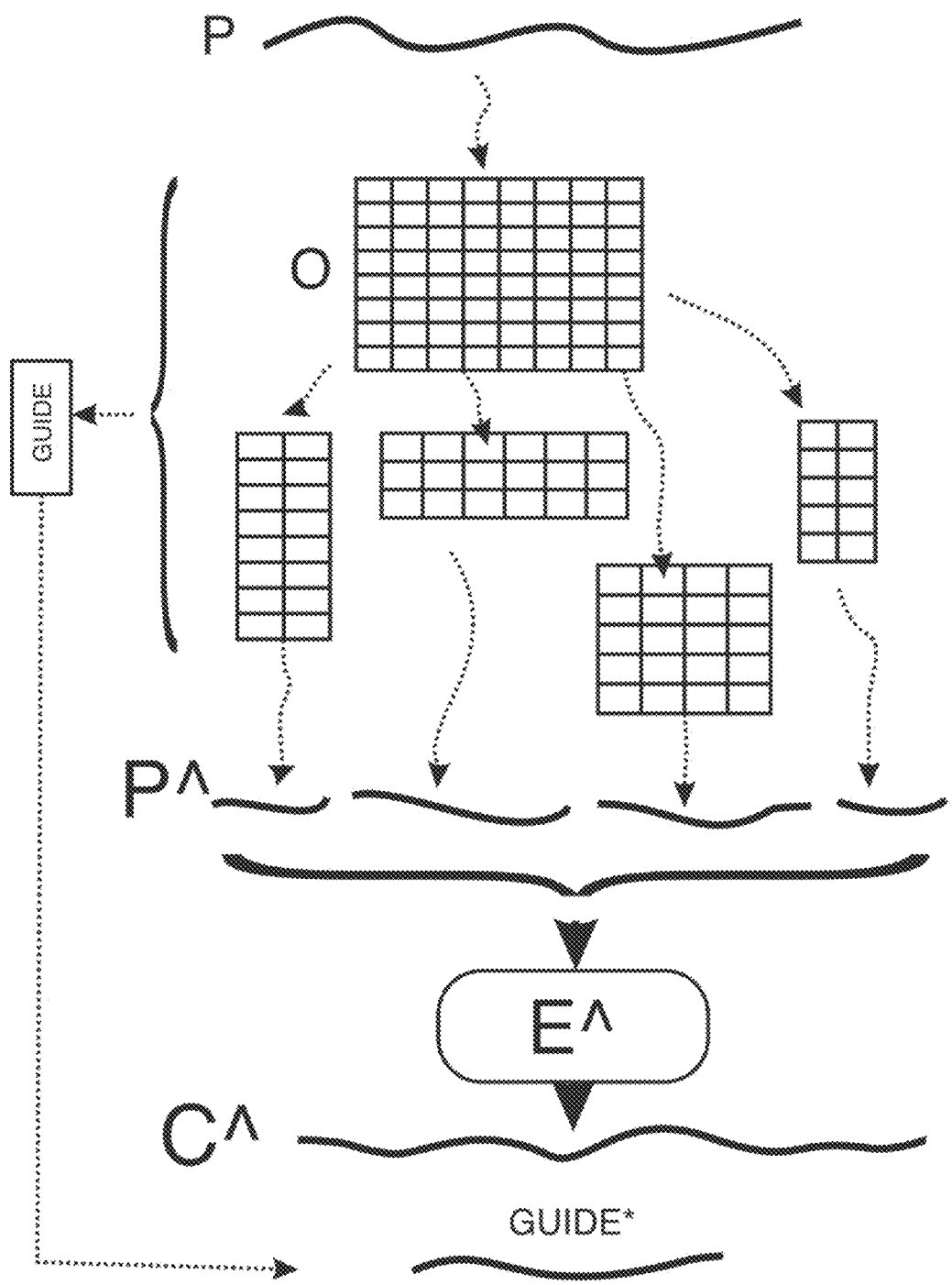

FIG. 8: Multi Dimensional Split Security

This figure shows a 2 dimensional (N=2) case for the multi dimensional split security. A given plaintext P is first mapped (folded) into a 2 dimensional space using a FMΩ formula, generating the Ω space (indicated in the figure with the letter O). Ω is then cut into four rectangles, each of the rectangles is then using an unfolding algorithm (FNω) to map each rectangle to a corresponding linear plaintext stretch. These 4 strings of plaintext per rectangle are then concatenated to the complete plaintext P^. P^ is fed into the E^ cipher which generates C^. Independently a guide is written. The guide identifies the parts to which Ω (O) has been divided, and the order in which they are written. The encryption of the guide is carried out in a quantum cryptanalytic resistant form (QCR). The P itself is encrypted in a Quantum cryptanalytic vulnerable (QCV) way, which reduces the burden. It has been shown that the equivocation of C^ is very high, on account of the decryption guide being QCR encrypted.

INTRODUCTION

The prevailing cryptographic means all generate 'committed ciphertext', namely ciphertexts that point unequivocally to the plaintext that generated them. These ciphers rely on the expected complexity of extraction of the plaintext from the ciphertext. Alas, complexity is a variable defense. Faster computers and smarter mathematics will chisel through the constructed wall of complexity, and extract the plaintext. The proper answer to this vulnerability is to apply non-committed ciphertexts. Namely ciphertexts that can be generated from more than one plaintext. These non-committed ciphertexts are inherently resistant to any superior mathematical smart, or to however-fast computers.

A non-committed ciphertext, C, will point to n>1 plaintexts $P_1, P_2, \ldots P_n$ such that there are n cryptographic keys $K_1, K_2, \ldots K_n$ for which we can write:

$$C=E^*(P_i, K_i)$$

where "E*" is the encryption function of the non-committing cipher, and i=1, 2, ... n.

This property of the non-committing ciphertext implies that however smart and computational potent an attacker may be, they cannot identify the generating plaintext $P_g$ ($1 \leq g \leq n$) without having knowledge of the corresponding key, $K_g$. The intended recipient though will use $K_g$ to extract $P_g$ from C.

This absolute countermeasure against terminal cryptanalysis comes with a price. The various ciphers that generated non-committing ciphertexts, do generate ciphertext larger, even much larger than the generating plaintext, and or require very large cryptographic keys.

$$|C| > \bullet > |P_g|$$

Such size enlargement is of little impact for small messages, but when the plaintext is a high resolution large picture, and more so if the plaintext is a large video then the size increase may become a major drawback.

One may mind that in general for any of the non-committed ciphers, the larger the value of n, the greater the size enlargement: $|C|/|P|$. On the other hand the larger the value of n, the greater the equivocation and the greater the security of the cipher.

We therefore face here a conflict between opting for higher security, and not being burdened by a very large size increase. This conflict may be negotiated for an optimal setting by choosing the non-committing cipher to use an optimal value for n such that n is not too small to limit its security impact, and on the other hand n is not too large to increase its handing burden (inconvenience) too much. For large plaintext this strategy is insufficient, and inventive intervention is called for.

This invention describes a means to resolve this conflict.

The underlying idea can be illustrated with reference to a video stream: given a frame, F of a video V, F is comprised of sections of variable entropy. One may select the high entropy sections to be encrypted with non-committing ciphers, and the rest with committing ciphertext. This will introduce a third factor to the optimization task.

Without the above selection idea a frame F can either be encrypted with a committing cipher, written as Ê, or with a non-committing cipher, written as E*. In the first case security will be minimal when facing quantum computers and smart attackers, but handling will be at maximum convenience, while in the latter case security will be maximum when facing omnipotent attacker, but convenience will be at the worst case.

To Encapsulate: We consider situations where the information to be protected, P is large. Encrypting it with mathematical security will impose an unwieldy large ciphertext C (P<<C), and/or require very large cryptographic keys. Encrypting P with a size-preserving, or size-similar ciphertext will be most convenient, but will be vulnerable to high-powered cryptanalysis. Given that both extremes are unattractive, we here propose a middle ground: Dividing P to a most critical part, P*, and a less critical part, P^. P=P*+P^. Applying non-committing cipher, E* to P*, and a committing cipher, Ê to P^. By adjusting the ratio P*/P^ one will adjust the size of the cipher C=C*^ to provide an optimal balance between security and convenience.

We designate the ciphers that generate committed ciphertext as quantum-cryptanalysis-vulnerable (QCV) ciphers, and ciphers that generate quantum-cryptanalysis-resistant ciphertext, as "quantum-resistant-cipher" (QCR).

We assign the symbols Ê and D̂ to the encryption and the decryption process of QCV ciphers respectively. We assign the symbols E*, and D* to the encryption and decryption process of QCR respectively.

We designate the plaintext and ciphertext of a QCV cipher as P^ and C^ respectively.

We designate the plaintext and ciphertext of a QCR cipher as P* and C* respectively.

We designate the process of splitting plaintext to a QCV part and a QCR part as "Split Security Solution" ($S^3$).

In general the plaintext P can be seen as an assembly oft substrings $P'_1, P'_2, \ldots P'_t$ of various sizes:

$$P = P'_1 \| P'_2 \| \ldots \| P'_t$$

where QCR slated strings and QCV slated strings alternate. All the parts of the plaintext P that were deemed critical and destined to be QCR encrypted appear between two substrings of P destined for QCV encryption (except for the case where the QCR substring is at the start or the end of P).

So we can use an alternative denomination:

$$P = P^{\wedge}_1 \| P^*_1 \| P^{\wedge}_2 \| P^*_2 \| \ldots \| P^{\wedge}_n \| P^*_n$$

where n=t/2, and where by definition the first substring of P will be QCV type. In the case that P starts with a QCR substring, it will be deemed as starting with a QCV string of size 0.

The general idea of $S^3$ is that P is first identified as a series of alternate substrings of type QCV and QCR; then it is being dismantled to separate the QCR strings from the QCV strings. The two groups are encrypted separately, creating the corresponding ciphertexts. The recipient decrypts the ciphertext, and then using re-assembly instructions to rebuild the original plaintext P.

How to Identify P*

Given a body of information P to be protected through graded encryption, ($S^3$), how to identify a worthy part P* therein (P*∈P), such that the combined encryption of P, C (P→C) will be optimal (namely will maximize the security of the plaintext communicators)?

The selection of P* should be carried out in light of the circumstances in which the protection of P is sought. Encryption assumes the presence of an information raider who wishes to gain an advantage on the communicators by learning the information in P which the communicators wish to withhold from the raider. We will assume that the raider will be effective enough to crack the encryption of the non-critical part, P^. Now given a fixed size for P*, |P*|, (because of convenience considerations) the question is what part of P of size |P*| will be most helpful for the information raider. That is the part the communicators will want to mark as P*—namely to deny the raider the information that would be most helpful for them, the information with the highest entropic impact.

Identifying P* this way can be done in several ways:
1. scenario analysis 2. database analytics 3. application specific Scenario Analysis In this method one creates a forward looking scenario as to what the information raider will gain from the information folded in various P* options, then selects the P* options that would be most helpful to the raider.

Database Analytics

In this method one analyzes prior similar cases where information needed to be protected. Various P* candidates are measured against the frequency of their appearance in past similar cases. The more frequent they are, the more anticipated they are, and of low entropic impact. One will select P* that is least frequent in the accumulated database.

Application Specific

Here P* selection will be based on the particular application and the nature of P. We focus on (i) photographic/video data, (ii) audio data.

Photographic Data
Selection may be according to:
1. pixel variance 2. contents interpretation The first method is based on reality that large expanses of skies or land consume many bits of data but have a small entropic impact. So the array of photographic bits is scanned by shifting a small 'inspection rectangle' and analyzing the variance of colors within this rectangle. High variance rectangles are slated for "critical" status.

Content Interpretation

In this method the photograph is processed by a content analyzer that recognizes known items. A ledger of sensitive items is prepared, and any part of the photograph that depicts such an item is slated for 'critical status'.

A simple implementation will by pass the need for a ledger. Photographs will be analyzed by facial recognition software that would spot faces depicted on the frame. These faces will be marked as critical.

Audio Data
Identifying selection methods:
1. speaker selection 2. content selection 3. tone selection With speaker selection a particular speaker in a conversing group is marked as 'critical' and all that that person is saying is regarded as critical (P*).

With content selection, the spoken words are processed through a voice interpreter, converted to words, and then words are selected to make the critical list. The selection may be based on "sensitive terms ledger" such that any spoken word listed on this ledger becomes critical. Or the selection may be based on a generic word frequency guide for the spoken language so that words which are rare in this language are marked for critical encryption.

In tone selection, high-pitch anger-speech, emotional speech are marked for the critical list.

QCR Options

Quantum cryptanalysis resistant (QCR) ciphers are based on proven equivocation. To achieve the desired equivocation one uses two means: (i) enlarged ciphertext, and (ii) large cryptographic keys. Often in combination. Equivocation is degraded with use, so to keep it up, one has either to use larger and larger ciphertexts, or replace keys often enough. Either option represents an operational inconvenience. The larger the amount of plaintext, the greater the impact of this inconvenience. It is therefore that the Split Security Solutions, ($S^3$) become a practical compromise. Identifying the parts of the plaintext with the highest entropic impact, namely the parts that if exposed give great advantage to the adversary relative to other parts, allows one to reserve the QCR assets for these high-impact parts of the plaintext, using less resilient ciphers for the rest.

As a reference we can analyze the normal Vernam cipher. The parties share a Vernam key of size k bits. This will allow them to encrypt a plaintext P* of size k bits. Given a plaintext P of size 10 k bits, the parties will be able to identify 10% of the plaintext to be Vernam encrypted (namely QCR encrypted), and use a nominal complexity based, size-preserving cipher to encrypt the remaining 9 k bits of the plaintext. When the Vernam key is exhausted, this $S^3$ solution is no longer available.

If instead of Vernam one will use BitFlip (U.S. Pat. No. 10,541,808) then QCR can be achieved via a secretly large key to begin with. And ever larger ciphertexts to be used as more and more plaintext undergoes the BitFlip encryption. Unlike with Vernam, the BitFlip key is of secret size so the adversary cannot appraise the effort needed to crack it. Also, unlike Vernam, the BitFlip user can add more and more meaningless bits to the ciphertext. The intended recipient of the ciphertext will readily spot and discard the meaningless ciphertext bits, but the cryptanalyst will suspect every bit to be meaningful, and will face persistent equivocation—ultimate QC resistance. So unlike with Vernam, the users of BitFlip, can continue to use their key indefinitely, albeit with greater and greater operational burden (until a new key is used). This might cause the users to keep limiting the ratio P*/P^.

Another cipher with similar attributes is described in the continued application Ser. No. 16/855,517 (SpaceFlip). Here too the size of the key is part of the secret, it may be very large. Also, the user may increase the size of the plaintext at will. In SpaceFlip the key is a map of unknown size, the ciphertext is a starting point on that key, and an indication of the length of a path walking on this map. The end point of the path is the plaintext letter. But that path can be made as long as desired, thereby creating equivocation and QC resilience.

The continued application (Ser. No. 17/216,274), SpaceFlip Plus is another example for a cipher that offers quantum cryptanalysis (QC) resilience through a key, large as desired, with its size being part of its secret.

Another option is encapsulated in U.S. Pat. No. 10,608,814, which is based again on a very large key of unknown size.

U.S. Pat. No. 11,038,668 which is based on U.S. Pat. No. 10,608,814, allows for both large keys and for unlimited increase of ciphertext, to maintain a threshold level of equivocation indefinitely.

U.S. Pat. No. 6,823,068 and #10,911,215 allow for both a secret large key, and a large as desired ciphertext, maintaining threshold equivocation for as long as needed.

Multi-Split Security Solutions ($MS^3$)

The split of P to P* and P^ may be extended to splitting P to $P^0, P^1, P^2, \ldots P^t$. This will provide more versatility to the users, but will complicate the selection process and will increase the operational burden. Once P is marked per t ciphers, it can be split to parts slated for each cipher, with similar markings as to the locations of each part of the plaintext and as to its length. These so called "addresses" of the plaintext substrings will be assembled to a file and delivered to the re-assembly module. In a multiple split it is necessary to convey ahead which of the cipher is applicable next. This information can be conveyed directly or by assuming always a sequence $P_1, P_2, \ldots, P_t$, where an empty string will be identified by having to identical position (m) values.

Illustration:
P=ZZXXXYYYYXXXXZZXXXZZZZXXYYYY, where X, Y, Z, and represent bits to be incepted with cipher $E_x$, $E_y$, and $E_z$ respectively. The agreed upon sequence is X, Y, Z, so we build an address file, μ which will become as follows:

We first mark:
P=ZZ XXX YYYY XXXX ZZ XXX ZZZZ XX YYYY
μ 1 . . . 3 . . . 6 . . . 10 . . . 14 . . . 16 . . . 19 . . . 23 . . . 25 . . . 29 . . . 29 . . . 29 . . . 29

Then we write
μ=1, 1, 1, 3, 6, 10, 10, 14, 14, 16, 19, 23, 25, 29, 29, 29

To be interpreted as the first X string is of size 0 (0=1−1), the first Y string is also of size 0 (0=1−1), the first Z string is of size 2 (2=3−1).

The second X string is of size 3 (3=6−3), the second Y string is of size 4 (4=14−10), the second Z string is of size 2 (2=16−14)

The third X string is of size 3 (3=19−16), the third Y string is of size 0 (0=19−19), the third Z string is of size 4 (4=23−19).

The fourth X string is of size 2 (2=25−23), the 4th Y string is of size 4 (4=29−25), the 4th Z string is of size 0 (0=29−29).

The fifth X string is of size 0 (0=29−29), The fifth Y string is of size 0 (0=29−29), The fifth Z string is of size 0 (0=29−29), Since all the three strings are zero, it signifies the end of the P string.

Since QCR ciphers may come with various degrees of equivocation, they would lend themselves to multiple split security applications to better optimize the balance between security and convenience.

Operation $S^3$ operates via the following operational elements:
1. Encryption Station (P→C) 2. communication channel C (sender→receiver) 3. Decryption Station (C→P)

This invention uses any prevailing channel to effect the communication of the ciphertext C from its sender to its receiver.

Encryption Station

The $S^3$ encryption station is comprised:
1. Plaintext Splitter (P→P*+P^)
2. QCR Encryption (C*=E*(P*))
3. QCV Encryption (C^=E^(P^))
4. Ciphertext Assembler (C*+C^→C)

Operational Sequence:
1. An external source submits a plaintext P to be $S^3$ processed.
2. The plaintext splitter (PS) splits P to P* an P^.
3. P* is encrypted to C*
4. P^ is encrypted to C^
5. The ciphertext assembler module assembles C from C* and C^.

C is then ready to be communicated to the recipient.

The Plaintext Splitter (PS)

To split a plaintext P to QCR part, P* and QCV part P^ it is necessary to: (i) identify P* in P, and (ii) effect the split.

Identifying P* in P

The steps for identifying P* in P are:
1. to assess the security threat associated with exposure of P and parts thereto.
2. to decide on a target balance security/convenience in implementing the $S^3$
3. to mark the dividing spot on the damage exposure line Assessing Security Threat $S^3$ users need to do: (i) divide P into t information units: $p_1, p_2, \ldots p_t$ of a small size and such that disclosure an information unit $p_i$ to the perceived adversary will be associated with an estimated damage $d_i$. Where the damage can be measured in dollars or in any other unit of choice.

Accordingly the damage from exposing a group g of information units marked as $p_1, p_2, \ldots p_g$ will be:

$$D_g = H_g + \Sigma d_i \text{ for } i=1,2,\ldots g$$

and where $H_g$ is the extra damage associated with the combined exposure of the g information units.

Once P was so parceled and the associated damage values determined, it is possible to list the information units on a list where the information units associated with smaller damage appear before the information units associated with greater damage.

This would be referred to the "Plaintext Exposure Damage Line" PED line.

One can then draw a curve above the PED line such that the height of the curve at point x on the line will mark the estimated damage from exposing the information units from the beginning of the line to point x. This will be regarded as the "Plaintext-Security Line" (PSL).

See FIGS. 4, 5.

Damage Assessment

Damage assessment associated with exposure of information to an adversary may be conducted by building several damage scenarios. In a damage scenario one estimates actions and conclusions taken by the adversary along with possible counter measures to ameliorate them. Each of these scenario $S_1, S_2, S_n$ is associated with a damage $D_1, D_2, \ldots D_n$ and with a probability to happen $\pi_1, \pi_2, \ldots \pi_n$.

The damage associated with the exposure of the identified information is computed to be:

$$D_{exposure} = \Sigma D_i * \pi_i, \ldots \text{ for } i=1,2,\ldots n$$

Deciding Balance Security/Convenience

The motivation for the $S_3$ tool is the high operational inconvenience associated with applying QCR to the full size plaintext P. Hence one is called to determine a desired balance between inconvenience and security. This requires setting a function that maps security against inconvenience, where a desired spot is being marked. Once marked then a security level is being determined and passed to the next module. See FIG. 5.

Marking the Split Point

Once the inconvenience/security balance point has been determined, it specifies a security target. This target is then marked on the damage exposure line. It becomes the split point. Looking at the damage exposure point beginning at 'zero damage' and progressing along that line until the split point, will identify all the information units that are slated to QCV encryption (P^) as the information units before that splitting point, and by contrast the information units listed ahead of the splitting point comprise the QCR plaintext (P*). See FIG. 5

Effecting the Split

To effect the split one must:
1. mark the P* substrings and the P^ substrings on P
2. extract location markings for the various substrings, μ
3. Extract by order the P* substrings into a combined P*
4. Extract by order the P^ substrings into a combined P^

In summary, we have:

$$P \rightarrow P^*, P^\wedge, \mu$$

Marking Substrings on P

The plaintext P is not organized in the order used in the plaintext exposure damage line (PED). Hence the bit string that represents the plaintext, P, is listed as a sequence of substrings:

$$P = s^\wedge_1 - s^*_1 - s^\wedge_2 - s^*_2 - \ldots s^\wedge_n - s^*_n$$

where $s^\wedge_i$ is the i-th substring slated for QCV encryption, and $s^*_i$ is the i-th substring slated for QCR encryption.

Let $m^*_i$ be the bit count where $s^*_i$ is listed on P. (the starting bit for $s^*_i$)

Let $m^\wedge_i$ be the bit count where $s^\wedge_i$, is listed on P. (the starting bit for $s^\wedge_i$)

The combined m-markings are listed as μ:

$$\mu = \{m^*_1, m^*_2, \ldots m^*_n, m^\wedge_1, m^\wedge_2, \ldots m^\wedge_n\}$$

This is the information needed for subsequent re-assembly of the plaintext parts.

Extracting Substrings Locations on P

The collection of 2n substrings, µ, is identified as 'assembly instructions' (ain), to be passed ahead.

Extracting P*

The n P* substrings $p^*_1, p^*_2, \ldots p^*_n$ are being concatenated to form P*:

$$P^* = p^*_1 \| p^*_2 \| \ldots p^*_n |$$

P* is marked to be ready to deliver it to the E* encryption module.

Extracting P^

The n P^ substrings $p^{\wedge}_1, p^{\wedge}_2, \ldots p_n$ are being concatenated to form P^:

$$P^{\wedge} = p^{\wedge}_1 \| p^{\wedge}_2 \| \ldots p^{\wedge}_n$$

P^ is marked to be ready to deliver it to the E^ encryption module.

QCR Encryption

The QCR encryption is carried out through cipher E* over P*, yielding C*. The sender is using a QCR key, K* shared with the recipient.

$$C^* = E^*(P^*, K^*)$$

C* is then marked to be ready for forwarding to the C assembly module.

QCV Encryption

The QCV encryption is carried out through cipher E^ over P^, yielding C^. The sender is using a QCV key, K^ shared with the recipient.

$$C^{\wedge} = E^{\wedge}(P^{\wedge}, K^{\wedge})$$

C^ is then marked to be ready for forwarding to the C assembly module.

Ciphertext Assembly

The ciphertext assembly module (CAM) receives, C*, C^ and µ and generates C:

$$\{C^*, C^{\wedge}, \mu\} \rightarrow C$$

There are several ways to compound the elements into C. The simplest way is to agree on an order, say:

$$C' = \mu \| C^* \| C^{\wedge}$$

and agree to reserve a known number of header bits where the location of C* and C^ in C will be identified:

$$C = [\text{header}] \| \mu \| C^* \| C^{\wedge}$$

In this arrangement u is sent in the clear. It does contain information regarding P. To avoid this 'leakage' one would encrypt u with a dedicated shared key $K^m$:

$$\mu_e = E_m(\mu, K_m)$$

The header also leaks information, so it too can be encrypted, using a shared header key, $K^h$ $$[\text{header}]_e = E^h([\text{header}], K^h)$$

Alternatively C can be plaintly assembled: C=[header] $\|\mu\|C^*\|C^{\wedge}$, and then encrypted with a shared assembly key $K_a$:

$$C_e = E^a(C, K^a)$$

Decryption Station

The decryption channel receives the ciphertext C, and is tasked with extracting P from it.

This happens through the following stages:
1. Ciphertext Disassembly (C→µ, C*, C^)
2. QCR Decryption (C*→P*)
3. QCV Decryption (C^→P^)
4. Plaintext Reassembly (P*, P^, µ→P)

The corresponding elements are
1. Ciphertext Disassembly Module
2. QCR Decryption Module
3. QCV Decryption Module
4. Plaintext Reassembly Module Ciphertext Disassembly This is the process of (C→µ, C*, C^). The order of these three strings is pre agreed and their length is either submitted through a header which is part of C or submitted separately. In one embodiment C may be sent out encrypted through assembly encryption carried out with a shared assembly key, $K^a$, and in that case it is being decrypted using the same shared key, C shows up as C=[header]$\|\mu\|C^*\|C^{\wedge}$. The ciphertext disassembly module reads the header, learns the length and positions of µ, C* and C^, and uses this separation to split to µ, C*, and C^.

In the event that C*, C^, and µ are being sent separately then there is no need for an act of separation.

If the cipher string is accompanied by a digital signature, then its integrity is being normally checked.

QCR Encryption

Using the shared K* the recipient decrypts C* passed to it from the ciphertext disassembly unit:

$$P^* = D^*(C^*, K^*)$$

QCV Decryption sing the shared K^ the recipient decrypts C^ passed to it from the ciphertext disassembly unit:

$$P^{\wedge} = D^{\wedge}(C^{\wedge}, K^{\wedge})$$

Plaintext Reassembly

The Plaintext Re-Assembly module takes in µ, P*, and P^ and rebuilds P.

The series of m points starts with $m^{\wedge}_1$. The module reads $m^{\wedge}_1$ and $m^*_1$ and then chips from P^ a substring of length $(m^*_1 - m^{\wedge}_1)$, which is the first QCV encrypted string, $p^{\wedge}_1$:

$$|p^{\wedge}_1| = m^*_1 - m^{\wedge}_1$$

Then the module reads in $m^{\wedge}_2$, cuts of the remaining string P* the first element $p^*_1$ which is of length:

$$|p^*_1| = m^{\wedge}_2 - m^*_1$$

And so on:

$$|p^{\wedge}_i| = m^*_i - m^{\wedge}_i$$

and:

$$|p^*_i| = m^{\wedge}_{i+1} - m^*_i$$

And thereby both P* and P^ are separated to their constituent parts.

Applications

We discuss:
1. Audio Security
2. Image Security
3. Video Security

The theoretical idea of analyzing threat scenarios from various states of plaintext exposure has to be reduced in most cases to a shortcut application.

We review the following ways to appraise entropic impact:
1. manifest variability
2. general rarity
3. object classification
4. code book.

Audio Security

High entropic impact parts of an audio file may be selected based on:
1. random selection
2. sound properties
3. voice recognition
4. textual interpretation .Random selection of P* is the simplest way to increase the security of the plaintext without much effort, but it is not very efficient.

Whichever selection method is used the schematics of operation is the same. The Plaintext Splitter is comprised of two modules: (i) P* selector, and (ii) P Disassembler. The P* selector depends on the selection method used. The P Disassembler is the same.

Sound Detection

Sound detection may be applied via (i) criteria, and via (ii) reference match, or a combination thereto.

In both cases the P selector will implant *-start flag in the audio file to indicate the start of a p* substring, and implant a *-end flag to indicate the end of that p* substring. When the P-Disassembler goes through the file, it recognizes the partition of P based on these flags, and constructs from their location the μ file, and then effects the split. The flags are of course removed. The flag are selected as a bit string that will not appear in the raw P file itself.

Criteria:

The common technology of sound filtering used to remove noise and enhance voice may be also used to identify sounds that are suspected to have a strong entropic impact (potentially a great harm if content exposed to the adversary). Such are high pitch voices, gender specific, etc. In that case the criteria needs to be specified to the software that looks for such selection. This software will pass through the voice file and implant a start-* marker when a sound stretch meets the criteria, and an end-* marker when the identified sound stretch is concluded and the file returns to normal.

The sound selector may also remove background noise to reduce the encryption burden as a whole. Criteria may be a whimpering voice, a slow or fast speaking voice, etc.

Reference Match

In this implementation the P-Selector is relying on a sound-reference library. The library includes voice and sound sampler that must be consulted for every stretch of audio file examined. If the stretch matches a library sampler, it is marked as QCR candidate. This will allow one to securely encrypt the words spoken by one party to a conversation, while the other speakers are nominally encrypted. Such library will be able to securely encrypt machinery sounds that are too revealing, or environmental sounds that betray location and time, etc. It is also possible to use this library to try to catch certain words that are too revealing. This is a bit more difficult because words can be spoken in different intonation and different pitch.

Voice Recognition

This method overlaps the library based sound recognition, only that it reflects a more serious attempt to extra encrypt a sensitive speaker. The voice of the designated speaker will be recorded for different words with different intonation and build up a comprehensive sample library. The voice recognition software will be more sophisticated and evaluate based on the likelihood that a sound heard on the audio file is really the words spoken by the designated speaker.

Textual Interpretation

In this method the audio file undergoes textual content interpretation through any of the prevailing voice interpretation packages. Once the file is translated to a text stream, it can be selected based on (i) rarity of terms, (ii) sensitive words library. In the first case, each interpreted word will be sent to a frequency of use module, that would give it a rarity grade. All words that are more rare than a given threshold will be considered as having a strong entropic impact and will be marked for QCR encryption. High frequency words will be left for ordinary encryption. In the library embodiment the interpreted words will be examined per the given library and marked for QCR security if there is a match.

Once there is a list of words to be high-security encrypted the audio file is run again and markers for p* substrings are implanted in it.

P Disassembly

1. The P Disassembler takes in the split instructions issued by the split selector, and translates them to a μ file—markings on P as to the partition of P to substrings of P* and P^.

2. Based on these instructions the Disassembler, starting from the beginning of P removes first $p^{\hat{}}_1$, then removes $p^{*}_1$ from P.

3. Next the Disassembler removes $p^{\hat{}}_2$, and $p^{*}_2$ from P by order.

4. The Disassembler will concatenate $p^{\hat{}}_2$ to $p^{\hat{}}_1$: P^(built-up)=$p^{\hat{}}_1 \| p^{\hat{}}_2$ 5. The Disassembler will concatenate $p^{*}_2$ to $p^{*}_1$: P*(built-up)=$p^{*}_1 \| p^{*}_2$.

6. The disassembler will continue and remove by order the pairs: $p^{\hat{}}_i$, $p^{*}_i$, for i=3, 4, . . . n (where n is the number of substrings pairs in P).

7. Each time a pair is removed, as in step 6, then the removed substrings will concatenate to the built up P^ and P*:

$$P^{\hat{}}(\text{built-up, step } i) = p^{\hat{}}_1 \| p^{\hat{}}_2 \ldots \| p^{\hat{}}_i, \text{ for } i=1,2,\ldots n$$

$$P^{*}(\text{built-up, step } i) = p^{*}_1 \| p^{*}_2 \ldots \| p^{*}_i, \text{ for } i=1,2,\ldots n$$

When done the P-Disassembler module will release P^, P*, and μ to the their next processing module.

If P starts with a p* rather than with a p^, then it will still be considered as starting with p^, only with a length 0. Similarly, if the last substring in P is a p^ rather than a p*, then P will be considered as concluding with a p* of size 0.

Illustration: let XX . . . be bits or QCR and YYY . . . bit as QCV. Let P be as follows:

$$P = XXYYYYXXXYY = XX\ YYY\ XXX\ YYY$$

It will be divided to $p^{\hat{}}_i$="", $p^{*}_1$=XX, $p^{\hat{}}_2$=YYYY, $p^{*}_2$=XXX, $p^{\hat{}}_3$=YYY, $p^{*}_3$="".

And the corresponding μ will be: 1, 1, 3, 7, 10, 13, 13

Image Security

We consider:
1. variance 2. geometry 3. interpretive approach

QCR areas on an image are commonly marked as a rectangle on the 2D display where they are analyzed. When the image is unwrapped line by horizontal line, the designated rectangle spreads into many width-size substrings that comprise the marked rectangle. This will generate a large number of substrings to represent a single image. The associated burden may be alleviated using an image slicing strategy where the image is cut out to smaller rectangular slices such that QCR designated areas fill a single slice.

An image listed as P can be cut to r rectangles $R_1$, $R_2$, . . . . $R_r$, such that each rectangular area of the image marked for QCR encryption will be represented by one of the r rectangles. Each of these rectangles can be regarded as a plaintext to be secured separately. The recipient will then puzzle-up the rectangles to the original P. By using a proper slicing strategy over the QCR marked area, the overall processing burden will be optimized.

For example, an image P containing 3 faces (1, 2, 3) of size $F_1$, $F_2$, $F_3$ respectively expressed in bit count, is composed of additional 5 rectangular areas marked 4, 5, 6, 7, 8 of sizes $Y_4$, $Y_5$, $Y_6$, $Y_7$, $Y_8$. The bit count of P, |P| is expressed as:

$$|P|=|F_1|+|F_2|+|F_3|+|Y_4|+|Y_5|+|Y_6|+|Y_7|+|Y_8|$$

each of the 8 rectangular components of P will be identified with 4 coordinates: $x_l$—the x (horizontal) coordinate of the vertices of the rectangle closest to the bottom left of the image (considered a origin), $x_s$—the bit size of the x side (horizontal) side of the marked rectangle, $y_l$—the y (vertical) coordinate of the vertices of the rectangle closest to the bottom left of the image (considered a origin), $y_s$—the bit size of the y side (vertical) side of the marked rectangle.

These four numbers will be regarded as the "puzzle coordinates" of each rectangle. We will add a fifth number, a crypto-class bit, θ, which will be θ=0 for QCV encryption and θ=1 for QCR encryption, and add to it the bit count of the corresponding cipher $c_i=|C_i|$. The bit count allocated to represent $c_i$ is about $c_i$=log (|C|), and may be transmitted in the open or pre agreed. We have then:

$$Q_i=\{x_{il},x_{is},y_{il},y_{is},\theta_i,c_i\}$$

for i=1, 2, . . . 8

The Q values are of known size. The number of bits needed to write the four values: $x_s$, $x_l$, $y_s$, $y_l$ is 4*log (S), where S is the bit count of the width or height of the image (whichever is larger). We add to it the θ bit, and we add $c_i$=log (|C|), and so we have:

$$|Q|=4 \log (S)+\log (|C|)+1$$

We can write then:

$$|P|=\Sigma x_{si}*y_{si} \ldots \text{ for } i=1,2 \ldots 8$$

Each of the 8 rectangular areas will be encrypted independent of the other, The three facial expressions will be encrypted with the QCR cipher: $C^*_1$, $C^*_2$, $C^*_3$, while the other five rectangles will be encrypted using the QCV: $C^\wedge_4$, $C^\wedge_5$, $C^\wedge_6$, $C^\wedge_7$, $C^\wedge_8$.

Once encrypted the bit count of each ciphertext is known: $c_i=|C_i|$ for $C_i=C^*_i$ and for $C_i=C^\wedge_i$.

The sender will now combine (concatenate) the Q values in a randomized order:

$$Q=Q_3-Q_1-Q_8-Q_4-Q_2-Q_7-Q_6-Q_5$$

Q will be QCR encrypted, to E*(Q) and communicated to the recipient.

The transmitter then will concatenate the 8 ciphertexts:

$$C(P)=C^*_3\|C^*_1\|C^\wedge_8\|C^\wedge_4\|C^*_2\|C^\wedge_7\|C^\wedge_6\|C^\wedge_5$$

And transmit C(P) to the recipient.

The recipient will first decrypt E*(Q) to Q, and then based on Q it will cut C(P) according to the $c_i$ values, decrypt for each rectangle area, and check if $D^*(C^*_i)=x_{is}*y_{is}=P^*_i$, and the same for the QCV rectangles. The recipient will check that: $D^\wedge(C^\wedge_i)=x_{is}*y_{is}=P^\wedge_i$.

Once the $P^*_i$ and the $P^\wedge_i$ are extracted, then the information in Q will guide the recipient to assemble them into the original P. If all checks out the secret communication is successful.

If for any reason the transmitter has to resend the same encrypted message then it will look very differently because the particular order used, namely: 3, 1, 8, 4, 2, 7, 6, 5

Moreover the transmitted may wish to split the image rectangle in a different manner, different 8 rectangles, or perhaps to more or less rectangles. The rectangles for the QCR encryption are left unchanged but the other are free for modification.

The recipient after receiving E*(Q) and decrypting it to Q will check if the information in Q is such that the 8 rectangles really "puzzle up" to a full image of the known size.

Variance Based Image Security

This are methods that do not require image interpretation capability. For example certain colors may be selected for high-security encryptions, or with a more sound logic, one would select image areas where the color and shape variability is high. These are areas of the image that convey a lot of information, more, say than an expansion of same color skies.

Another variability criteria will be some color combination, any place where a certain light blue appears next to a dark red, for example, this area should be QCR encrypted.

Geometry Selection

A simple geometry selection will be to mark the center of the image for QCR encryption, under the assumption that the more important part of an image is displayed in the center.

With a bit of interpretive efforts lines may be identified and junction points for them may be marked for QCR.

Interpretive Image Security

This method requires image interpretive software which is quite common today. This software will identify objects depicted on the image. The identified objects may then be sorted out to P* and P^.

We consider the following sorting protocols:

1. rarity of objects 2. library of objects 3. human identity markers

Rare objects carry a strong entropic impact, and will be marked for high grade security. One does not need to list rare objects. It is enough to use a relatively short list of common objects (books, chair, trees, etc), and then slate for QCR any object that is not listed in the common objects list.

The selection module may rely on a library of specific objects that should be highly protected. These may be depictions of a technology implementation, or an industrial secret machinery. It may hide firearms, and other weapons, etc. The Plaintext Splitter, or more precisely the P*-Selector module will run every recognized object in the image against the library of highly protected objects, and mark such objects for *-status, if found in the list.

The most obvious human identity marker is one's face. Today facial recognition software is very common and very effective. It will readily spot all faces in an image and mark each face to be QCR encrypted. In addition the software may be trained for recognizing tattoos and also designate them for QCR grade encryption.

Video Security

Video stream may be regarded as a stream of images, and hence the way image is being treated with $S^3$ will apply to a video. Because high definition videos are very large, the burden of QCR over them will be more pronounced, and the user will be inclined to shift the balance security/convenience towards less security and more convenience.

Multi-Dimensional Split Security (MDSS) Solutions

As an extension of the rectangular division approach to image security one can define a multi dimensional split security algorithm with important security benefits.

We consider a linear plaintext P of size |P| bits.

Let FNΩ be a formula for mapping P onto an N dimensional space, $\Omega = \Omega_N$, of dimensions $d_1, d_2, \ldots d_N$, such that:

$$|P| = \pi(d_i) \ldots \text{ for } i=1,2 \ldots N$$

The mapping is without holes, and is reversible:

$$\Omega = FN\Omega(P); P = FN\Omega(\Omega)$$

One of the vertices of this N-dimensional cube is assigned to be the origin, and relative to it every bit in P is associated with N coordinates reflecting the position of that bit relative to the origin. Point x on Ω will have coordinates $x_1, x_2, \ldots x_N$, such that: $1 \leq x_i \leq d_i$ for $i=1, 2, \ldots |P|$.

One will then specify r N-dimensional cubes, $\omega_i$ in $\Omega_N$ such that all of Ω is claimed by the r cubes:

$$\Omega_N = \Sigma \omega_i \text{ for } i=1,2, \ldots r$$

Let $q_i$ be a 2N tuple that reflects the N coordinates of the vertex of $\omega_i$ which is closest to the origin, followed by the N coordinates of the vertex which is the farthest from the origin:

$$q_i = \{x_1, x_2, \ldots x_N, y_1, y_2, \ldots y_N\}$$

where the x-values are the coordinates of the closest vertex and the y values are the coordinates of the furthest vertex.

$q_i$ completely specifies $\omega_i$—size and location.

$$|\omega_j| = \pi(y_{ji} - x_{ji}) \ldots \text{ for } i=1,2, \ldots N, \text{ for } i=1,2, \ldots r$$

$$|P| = \Sigma |\omega_j| = \Sigma(\pi(y_{ji} - x_{ji}) \text{ for for } i=1,2, \ldots N, \text{ for } i=1, 2, \ldots r$$

Let FNω be an unfolding formula that stretches the content of $\omega_i$ for $i=1, 2, \ldots r$ to a linear sequence: $l_i$, and is also applicable in reverse, to re-fold $l_i$ to $\omega_i$, Let Ê be a size-preserving cipher that maps $l_i$ to $c_i$ such that:

$$|l_i| = |c_i|$$

Here and else where the vertical lines embracing an expression denote the bit count associated with the expression. Let one select an arbitrary permutation of the ω elements, and assign this permutation the indices 1, 2, . . . r. Using the selected permutation one would concatenate the encrypted linear versions of ωi ($c_i$):

$$C = c_1 \| c_2 \| \ldots c_r$$

We define η=ceiling (log (|P|)), namely η is the smallest integer for which η≥log(|P|). Clearly any coordinates of any $\omega_i$ cube can be expressed in a bit string of size η bits. So a $q_i$ for $\omega_i$ can be expressed in 2Nη bits.

One now concatenates the r $Q_i$ expressions:

$$Q = q_1 \| q_2 \| \ldots \| q_r.$$

so that |Q|=2rNη.

The crux of this protocol comes now. The Q string one encrypt at a QCR level:

$$Q^* = E^*(Q)$$

The transmitter than transmit Q* to the intended recipient. The recipient decrypts Q*:

$$Q = D^*(Q^*)$$

and interprets Q based on the formula $|q_i|$=2Nη for i=1, 2, . . . r. The recipient then evaluates Q to check if the r ω N dimensional cubes fit together to the Ω (no holes inside), such that |Ω|=|P|. If it fits the recipient is now ready to receive the QCV encrypted P, namely C.

Upon receipt of C, the recipient will use the information in Q to parcel C to the right sequence of $c_i$ because the C string was encrypted with a size preserving Ê cipher:

$$|c_j| = |p_j| = \pi(y_{ji} - x_{ji}) \ldots \text{ for } i=1,2, \ldots N$$

Once the r $c_i$ are separated from C, they each will be decrypted:

$$p_i = D\hat{}(c_i)$$

And then the recipient will use the FNω formula to fold $p_i$ to the corresponding ωi for i=1, 2, . . . r.

When the folding is done Ω is fully reconstructed by the recipient. The recipient then will apply FNΩ to unfold Ω to P, and this accomplish the protocol.

The idea behind this protocol is that |Q|<<|C|, namely guiding information Q for how to interpret the ciphertext C is much smaller is size then the ciphertext. Therefore it is not too much of a burden to use QCR over Q. This will insure such a large degree of equivocation over C that even if it is decrypted to D^(C), there would be so many ways to map D^(C) to P that P will remain secret. This is because there are so many possibilities to parcel Ω to N-dimensional cubes, and the more FNΩ differs from FMω, the greater the equivocation.

In fact, the equivocation of D^(Q) is so high that Ê might be neutral, namely no encryption, or say:

$$p_i = c_i$$

in that case C will be a permutation of P.

Folding and Unfolding Algorithms

In order to increase the potency of the multi dimensional security split one will choose different folding and unfolding algorithms for FNΩ and FNω.

One way to achieve this variety to pick randomly N "jump values": $J_1, J_2, \ldots J_N$. And define:

Referring to a given ω N-dimensional cube, let point X on Ω be defined through N coordinates: $X = \{x_1, x_2, \ldots x_N\}$.

We set the ω address of the first bit in $p_j$, to be X, defined through N coordinates: $x_i = 1$ for $i=1, 2, \ldots N$ We compute now:

$$y_i = (x_i + J_i) \bmod d_i$$

for all i=1, 2, . . . N.

We define now point Y as:

$$Y = \{y_1, y_2, \ldots y_N\}$$

If point Y is empty then Y is the address of the next bit in $p_j$ (the linear version of the content of that ω).

If point Y is already taken by a former bit in $p_j$ then one looks to a near by empty point as follows:

Check point $Y^1 = \{y_1+1, y_2, \ldots y_N\}$. If $Y^1$ is empty, then set up: $Y^1$ to be the address of the next bit in $p_j$.

If $Y^1$ is taken then check: $Y^2 = \{y_1+1, y_2+1, \ldots y_N\}$

If $Y^2$ is empty it is the address of the next bit in $p_j$, if taken then continue as above, increment $y_3$, then $y_4$. After incrementing $y_N$, $y_1$ should be incremented further to $y_1+2$, and so on. the increments of any $y_i$ are all module $d_i$, and hence eventually of $p_j$ will be mapped unambiguously to $\omega_i$.

This folding algorithm can be used for carry out the reverse: to unfold $\omega_i$ to $p_j$, as follows.

The first bit in $p_j$ will be the bit stationed at the origin of the $\omega_j$. The second bit has the address specified by $$Y_2 = \{y_1, y_2, \ldots y_N\} = \{(1+J_1) \bmod d_1, (1+J_1) \bmod d_2), \ldots \}$$

If $Y_2$ has already been used (its bit content removed to the built up $p_j$) then one uses the above incremental formula to check point: $Y^2=\{y_1+1, y_2, \ldots y_N\}$, It bit content is taken to be the next bit in $p_j$. If its bit content has been removed before then $y_2$ is incremented, and so on, as above, until a point with an unused (uncopied) bit is found. This operation will map all the bits in every ω unit to its corresponding $p_i$.

Such mapping is very much dependent on the J values, and on the dimensions of each ω N-dimensional cube.

MDSS Over Larger Bit Grouping

The MDSS above operated with the bit as the foundational unit, a string of it defines the plaintexts $p_i$ for all the plaintexts that P is divided into. One can generalize the same operation over a group of bits, say a byte or a word. The selected group will the unit of bits that comprise the plaintext P, it will be the unit of bits that sits in a particular address in Ω and ω N-dimensional spaces. The formulas and algorithms will work very much the same be it with one group at a time or a few bits as a unit.

MDSS Analysis

The underlying idea for MDSS is that instead of using the shared key to encrypt the plaintext, one is using the shared key to encrypt the instructions for re-organizing the ciphertext to the original plaintext. These instructions are based on random data input. The large portion of used randomness is unilateral, and the remaining portion is bilateral. The bilateral randomness is known as the shared cryptographic key, the unilateral randomness is unshared a-priori, it is picked by the transmitter as they please. The way the cipher is constructed, the intended recipient will be able to extract the plaintext despite the impact of this unilateral randomness. The attacker will be confounded by all the randomness that is used in the attacked cipher. To make a cipher quantum-cryptanalytic resilient (QCR), one has to infuse sufficient randomness to induce equivocation as the ultimate counter-measure against sophisticated hacking. So MDSS are ciphers built such that a few dis-organizing instructions create a ciphertext that is very much non-committing—associated with a lot of equivocation, and where these instructions can be encapsulated in a small data set. This instructions data set will be QCR encrypted, and thereby cement the equivocation of the ciphertext, without having to QCR encrypt the full plaintext.

In a general way a plaintext P of bit size |P| can be guides for generating a ciphertext C using a guide comprised of log(|P|) measure of data. The dis-organizing of P may be so effective that the ciphertext C may be simply a permutation of P.

What is claimed is:

1. A method to limit the security damage from a successful cryptanalysis of a ciphertext, of a plaintext P, by applying a Split Security Solution ($S^3$) protocol, in which highly sensitive parts of the plaintext, are encrypted to a ciphertext that can be decrypted to plausible plaintexts other than the one plaintext that was encrypted into that ciphertext (equivocation encryption) comprising:
by a computing device:
(i) identifying plaintext parts, P*, of the plaintext P, that when compromised create higher security risk;
(ii) encrypting these higher security risk plaintext parts P* with an equivocation generating cipher, E*, using a shared key, K*, while encrypting the remaining lower security risk plaintext parts, Pˆ=P−P*, of the plaintext P with a zero-equivocation cipher, Eˆ, using an additional shared key, Kˆ; and
(iii) communicating the two ciphertexts C*=E*(P*, K*) and Cˆ=Eˆ(Pˆ, Kˆ) to the intended recipient, along with re-assembly instructions enabling the recipient to build back the plaintext P after decrypting C* to P* using key K* and a corresponding decryption algorithm D* (P*=D*(C*,K*)), and decrypting Cˆ to Pˆ using key Kˆ and a corresponding decryption algorithm Dˆ(Pˆ=Dˆ(Cˆ, Kˆ);
the method further comprising:
(x) by an Encryption Station, comprising:
(x)a: a Plaintext Splitter P→P*+Pˆ+splitting information, μ;
(x)b: an Equivocation Generating Encryption (C*=E*(P*, K*);
(x)c: a Zero-Equivocation Generating Encryption (Cˆ=Eˆ (Pˆ, Kˆ)); and
(x)d: a Ciphertext Assembler module (C*+Cˆ→C);
with the following steps executed by the Encryption Station:
(x)1. an external source submits a plaintext P to be Split Security Solution ($S^3$) processed;
(x)2. the plaintext splitter (PS) splits P to P* and Pˆ;
(x)3. P* is encrypted with E* to C* using K*;
(x)4. Pˆ is encrypted with Eˆ to Cˆ using Kˆ; and
(x)5. the ciphertext assembler module assembles C from C* and Cˆ and μ;
(y) by a Decryption Station comprising:
(y)a: a Ciphertext Disassembly Module;
(y)b: an Equivocation resolving Decryption Module (D*);
(y)c: a Zero Equivocation Decryption Module (Dˆ); and
(y)d: a Plaintext Reassembly Module;
with the following steps executed by the Decryption Station:
(y)1. Ciphertext Disassembly (C→μ, C*, Cˆ);
(y)2. Equivocation resolving Decryption, P*=D*(C*, K*);
(y)3. Zero Equivocation Decryption, Pˆ=Dˆ(Cˆ, Kˆ); and
(y)4. Plaintext Reassembly (P*, Pˆ, μ→P).

2. The method of claim 1, further comprising:
implementing image security where P* comprises any one or more of the following:
(I) listed sensitive items: comprising machinery, gadgets, and/or constructions that are listed in a reference ledger as being of a special high priority security risk, and
(II) human identifying features: comprising faces, birth marks, and/or tattoos.

3. The method of claim 2, further comprising:
scanning an image with facial recognition software before generating encrypted image data, identifying rectangles depicting human faces, marking the identified rectangles depicting human faces for higher security risk E* encryption, and marking the remainder of the image for lower security risk Eˆ encryption; and further:
identifying by item recognition software listed sensitive items on the pre-encrypted image, and slating the pixels depicting these items for higher security, E* encryption.

4. The method of claim 1, further comprising:
securing audio files with P* determined by (I) voice recognition for a target speaker, where spoken words that the target speaker speaks are regarded as P* and the balance of spoken words as Pˆ, and by (II) voice transcription, where the transcribed words are checked against a list of words that require higher security protection.

5. A method of secret transposition encryption, $E\hat{}$, of a plaintext P to a ciphertext Cp ($Cp=E\hat{}(P, K)$), where a transposition key, K, is encrypted with a cipher $E^*$ using a key, $K^*$, which is shared between a sender and a recipient, to a ciphertext Ck that can be decrypted to different transposition keys, other than K, with each of these other transposition keys leading to a plausible plaintext, thereby ensuring equivocation as to the identity of the pre-transposition message, plaintext P, comprising:

sharing randomness between a sender's computing device and a recipient's computing device by only sharing a random key, $K^*$, between the sender's computing device and the recipient's computing device;

by the sender's computing device:

encrypting K, to Ck, with an equivocation generating cipher, $E^*$, utilizing the previously shared random key, $K^*$, $Ck=E^*(K, K^*)$ where $K^*$ is shared between both the sender's computing device and the recipient's computing device, with the cipher $E^*$ operating with larger quantities of ad hoc randomness not preshared between the sender and the recipient, and smaller quantities of pre-shared randomness, (bilateral randomness), $K^*$, providing additional security protection by creating an equivocation challenge in the encrypted bit stream Ck to prevent any unauthorized third party's attempt to decrypt the encrypted bit stream Ck from succeeding;

transmitting the encrypted bit stream Ck to the recipient's computing device;

by the recipient's computing device:

receiving the encrypted bit stream Ck from the sender's computing device; and decrypting the encrypted bit stream, Ck, to K, with a corresponding equivocation resolving cipher, $D^*$, $K=D^*(Ck, K^*)$ utilizing the previously shared random key, $K^*$;

the sender's computing device transposing P to C using K, sending C to the recipient's computing device;

then the recipient's computing device reverse transposes C to P using K.

6. The method of claim 5, further comprising:

mapping, by the sender's computing device, P into an N-dimensional space, $\Omega$, using a mapping algorithm FN$\Omega$, with each bit of P occupying an N-dimensional address in $\Omega$;

dividing, by the sender's computing device, $\Omega$ into n N-dimensional cubes, $\omega_i$, for i=1, 2, ... n, with the address and size of each of the n N-dimensional cubes recorded in a cube-address file, Q;

mapping, by the sender's computing device, the content of each N-dimensional cube onto a linear string, $c_i$ for i=1, 2, ... n using a mapping algorithm, FN$\omega$, which is different from mapping algorithm FN$\omega$; and concatenating, by the sender's computing device, the n $c_i$ strings in an order O, to form a string C, with O added to file Q;

wherein Q and O constitute the transposition key K with which P is encrypted to C, where K is encrypted by the sender to Ck, using the shared key, $K^*$.

* * * * *